Patented Aug. 29, 1933

1,924,443

UNITED STATES PATENT OFFICE 1,924,443

HALOGENATION OF CYCLIC COMPOUNDS

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application March 8, 1929, Serial No. 345,587, and in Germany October 19, 1928

10 Claims. (Cl. 260—61)

The present invention relates to the halogenation of aromatic compounds by means of halogen hydrides.

We have found that one or several hydrogen atoms attached to the nucleus of a cyclic, that is hydroaromatic or aromatic compound can be replaced by the same or different halogens by acting on the said compound with halogen hydride in an acid selected from the group consisting of oleum, chlorosulphonic acid and mixtures of these acids, in the presence of a halogen carrier. The term "halogen" when used in the description and the appended claims is meant to comprise the halogens, chlorine, bromine and iodine. The usual halogen carriers may be employed for the halogenation, particularly suitable are, for instance, sulphur, iodine, antimony, arsenic, bismuth and mercury and compounds thereof, such as the amalgams, of which up to about 10 per cent by weight calculated on the amount of the substance subjected to halogenation are to be employed. The exact amount to be taken depends on the efficiency of the halogen transferrer and the reactivity of the substance to be halogenated.

Since the process is applicable to all cyclic, hydro-aromatic as well as aromatic compounds, and among the latter to isocyclic as well as heterocyclic compounds, a definite range of temperature necessary for carrying out halogenation by means of halogen hydrides cannot be given. Generally speaking, the temperatures to be employed are those applied when halogenating the substances in the usual manner by means of the free halogens; thus, in many instances, halogenation already occurs at ordinary temperature. The temperature at which the reaction is to be carried out also depends on the amount and the kind of halogen transferrer added. Higher temperatures are to be applied in case the halogenation is carried out in oleum containing only a few per cent of sulphur trioxide. Since the acids employed are capable of oxidizing the substances under treatment, or otherwise reacting therewith, for instance with the formation of sulphonic acids, the temperatures should be so chosen as to avoid such undesired reactions. In some cases, however, such secondary reactions are even desired, for instance, when it is intended to prepare halogenated solphonic acids of aromatic hydrocarbons, such as chlorinated naphthalene sulphonic acids and the like, or to produce quinones. Thus for example, when brominating perylene in chlorosulphonic acid in the presence of iodine, brominated perylenequinone is directly obtained.

According to our invention all cyclic compounds can be halogenated. The more specific term "aromatic compounds" comprises, as stated above, isocyclic as well as heterocyclic compounds, for instance, hydrocarbons, such as benzene, naphthalene, anthracene, pyrene, perylene, their homologues and substitution products, for instance, their nitro, amino and halogen derivatives. Furthermore, oxygen containing aromatic compounds, of which the corresponding hydrocarbons are not yet known, may be halogenated in the aforesaid manner, for instance, benzanthrones, dibenzanthrones, the different kinds of dianthrones, such as ms-benzdianthrones, ms-naphthodianthrones, allo-ms-naphthodianthrones, ms-anthradianthrones, anthanthrones and the like, or dibenzpyrenequinones, or compounds which are isomeric to the aforesaid substances. Likewise, heterocyclic compounds can be halogenated by means of halogen hydrides according to our invention, for example, azines, acridones, acridines, thioindigo, pyrazolanthrone, quinoline, pyridine, thioacridones, coeramidonines and substitution products thereof.

The hologenation of cyclic compounds by means of halogen hydrides in the manner described proceeds in most cases about quantitatively, and is therefore of particular interest when compounds of a certain stage of halogenation are to be produced. Moreover, the process provides a method for perfectly utilizing halogen hydrides obtained as waste gases in many processes in the chemical industry. It is, however, not necessary to introduce the halogen hydrides in the free state into the reaction mixture, but they may also be formed in the reaction mixture itself by the interaction of halogen compounds with the acid employed, for instance, by the addition of salts of the halogen hydrides to be employed, such as alkali metal salts, for example sodium chloride, sodium bromide, or potassium iodide.

Several different halogens can of course be introduced into the cyclic compounds according to our invention in one operation by employing different halogen hydrides or the corresponding alkali metal salts.

The process is of particular advantage for the halogenation of polynuclear aromatic compounds, also such as contain a carbonyl group, as it provides an economic way of producing valuable intermediate products for the preparation of dyestuffs, or in case the aromatic polynuclear compounds contain groups capable of being vatted for the production of vat dyestuffs, which may also be produced in one operation by simultaneous oxidation and halogenation of the corresponding polynuclear aromatic hydrocarbons, as for instance as described above with respect to perylene which on bromination in chlorosulphonic acid by means of hydrogen bromide in the presence of iodine yields brominated perylenequinone.

Particularly valuable new vat dyestuffs which can be produced according to our invention are the monohalogen derivatives of monoalkyl ethers of anthanthrone in which the alkyl group may further be substituted. The dyeings obtained therewith on cotton are distinguished by their excellent fastness to light and to atmospheric influences.

The following examples will further illustrate the nature of our invention, but the invention is not restricted thereto. The parts are by weight.

*Example 1*

46 parts of dibenzanthrone are dissolved at ordinary temperature, while stirring in 460 parts of chlorosulphonic acid. After the addition of 5 parts of antimony the temperature is raised to between 60 and 65° C. and dry halogen bromide is passed into the solution. As soon as the weight of the reaction mixture has increased by about 35 per cent of the dibenzanthrone employed, the reaction mixture is allowed to cool, diluted with 230 parts of concentrated sulphuric acid, poured into ice-cold water, and the whole is boiled for a short time and filtered by suction. The dyestuff obtained, a dibromodibenzanthrone according to analysis, is a violet paste, and a blue violet powder when dry, dissolving to a red violet solution in concentrated sulphuric acid, and dyes cotton excellent fast marine blue shades from a violet vat.

If the introduction of hydrogen bromide be continued for a longer period higher brominated products of similar tinctorial properties are obtained.

Sulphur, iodine, mercury and other halogenating catalysts may be employed instead of antimony.

The corresponding brominated iso-dibenzanthrones are obtained under the above stated conditions from iso-dibenzanthrone.

*Example 2*

20 parts of pyranthrone are dissolved at ordinary temperature, while stirring, in 200 parts of chlorosulphonic acid; thereupon 2 parts of sulphur are added and the temperature is raised to 65° C. and dry hydrogen bromide passed into the solution. When the desired increase by weight is attained which, for instance in the case of tetra-bromopyranthrone, amounts to 80 per cent calculated on the amount of pyranthrone employed, the mixture is allowed to cool and worked up as described in Example 1. The di-, tri-, or tetra-bromopyranthrones obtainable in the aforesaid manner dissolve to a blue solution in concentrated sulphuric acid and dye the vegetable fibre very fast orange to orange-red shades.

By employing hydrogen chloride instead of hydrogen bromide the corresponding chloropyranthrones are obtained.

*Example 3*

Dry hydrogen bromide is passed into a solution of 16.6 parts of pure 3.4.8.9-dibenzopyrone-5.10-quinone in 200 parts of chlorosulphonic acid to which 2 parts of iodine have been added at 65° C., until an increase by weight is obtained corresponding to 25 per cent by weight of the said quinone. The reaction mixture is then allowed to cool and worked up as described in Example 1. The mono-bromo-3.4.8.9-dibenzopyrene-5.10-quinone obtained is an orange-yellow paste and a yellow-orange powder when dry, dissolves to a red-violet solution in concentrated sulphuric acid and dyes cotton from a scarlet vat fast bright, yellow-orange shades.

Oleum may be used as dissolving medium instead of chlorosulphonic acid.

When introducing hydrogen bromide for a longer period of time higher brominated products are obtained.

If the isomeric 4.5.8.9-dibenzopyrene-3.10-quinone be employed instead of 3.4.8.9-dibenzopyrene-5.10-quinone a dyestuff is obtained dyeing cotton from an orange-red vat red shades.

*Example 4*

20 parts of toluene are introduced, while stirring, into a solution of 2 parts of iodine in 100 parts of chlorosulphonic acid which is cooled by a mixture of ice and common salt. Dry hydrogen bromide is passed into the reaction mixture which is allowed to warm to between 20 and 30° C. As soon as the toluene employed has entered into reaction which takes place in a short time, the reaction mixture is diluted with 50 parts of concentrated sulphuric acid, poured into water and the bromotoluene formed is separated. It is a light colored liquid which does not solidify at 0° C. and boils between 138 and 140° C. under a pressure of 15 millimeters of mercury.

Di- and higher brominated derivatives, such as tetra-bromobenzene and hexabromobenzene are obtained in a similar manner from benzene. Naphthalene and phenanthrene, also hydroaromatic compounds, such as hexahydrobenzene, can be brominated in the said way.

*Example 5*

24 parts of potassium bromide are slowly introduced into a stirred solution of 40 parts of pyranthrone in 400 parts of chlorosulphonic acid to which 4 parts of sulphur have been added, while taking care that the temperature does not rise above 60 to 65° C. After all of the potassium bromide has been added, the reaction mixture is stirred at 60° C. for from 2 to 3 further hours and then brought into ice-cold water after dilution with sulphuric acid.

The di-bromopyranthrone separating in orange-red flocks is sucked off. The dyestuff dissolves to a blue solution in concentrated sulphuric acid and dyes cotton orange shades from a red violet vat.

Tetrabromopyranthrone is obtained under the stated conditions when bringing 50 parts of potassium bromide to reaction.

*Example 6*

25 parts of potassium bromide are introduced at 40° C. into a stirred solution of 46 parts of di-benzanthrone in 460 parts of chlorosulphonic acid to which 0.5 part of antimony has been added. After the addition of potassium bromide the reaction mixture is allowed to warm to between 60 and 65° C., at which temperature the reaction mixture is maintained for about 3 hours. The dyestuff thus obtained is worked up in the usual manner and forms a violet powder dissolving to a violet solution in sulphuric acid and dyeing cotton fast marine blue shades from a violet vat.

By brominating isodibenzanthrone under the same conditions a dyestuff is obtained dissolving to a green solution in sulphuric acid and dyeing vegetable fibre clear blue-violet shades from a violet vat.

Example 7

45 parts of N-dihydro-1.2-2'.1'-anthraquinoneazine are dissolved in 450 parts of chlorosulphonic acid and the mixture is warmed, while stirring, to between 60 and 65° C. after the addition of 2 parts of antimony and 2 parts of sulphur, whereupon dry hydrogen bromide is passed into the solution for several hours. The reaction mixture is allowed to cool and worked up in the usual way. The brominated N-dihydro-1.2-2'.1'-anthraquinoneazine obtained dyes cotton from a blue vat very fast blue shades.

Bromopyridines are obtained from pyridine in an analogous manner. Potassium bromide may be employed instead of hydrogen bromide.

Example 8

30 parts of potassium bromide are added, while stirring, at between 55 and 65° C. to a solution of 33.2 parts of 3.4.8.9-dibenzopyrene-5.10-quinone in 300 parts of chlorosulphonic acid to which 3 parts of iodine have been added. The reaction mixture is stirred at about 65 to 70° C. until a sample of the reaction product dissolves in concentrated sulphuric acid to a violet-blue solution. The reaction mixture is then allowed to cool and worked up as usual. The dibromo-3.4.8.9-dibenzopyrene-5.10-quinone obtained is an orange powder crystallizing in orange needles and dyes cotton excellently fast orange shades from a violet vat.

When employing the same amount of 4.5.8.9-dibenzopyrene-3.10-quinone instead of the aforesaid quinone a reaction product dyeing blue-red shades is obtained.

Example 9

46 parts of pure dibenzanthrone are dissolved in 460 parts of chlorosulphonic acid. After the addition of 20 parts of iron sulphate and 4 parts of sulphur the reaction mixture is warmed, while stirring, to between 90 and 100° C. and dry hydrogen chloride is passed into a solution until a sample of the reaction product dissolves to a violet-blue solution in sulphuric acid. The reaction mixture is then allowed to cool and worked up as usual. The chlorodibenzanthrone obtained is a violet-blue powder dissolving to a violet solution in concentrated sulphuric acid.

A chlorinated dyestuff dyeing cotton violet shades from a blue vat is produced in an analogous manner by employing isodibenzanthrone instead of dibenzanthrone.

Example 10

Dry hydrogen bromide is passed at between 50 and 60° C. into a stirred solution of 23 parts of benzanthrone in 200 parts of chlorosulphonic acid to which 2 parts of iodine have been added. The reaction mixture is allowed to cool after several hours and worked up as usual. The bromobenzanthrone obtained is a yellow powder crystallizing in needles and dissolving to a red-brown solution in concentrated sulphuric acid.

Example 11

45 parts of 5.6.1.2-diphthaloylacridone are dissolved in 400 parts of chlorosulphonic acid and warmed to between 90 and 100° C. after the addition of 2 parts of iodine and 2 parts of antimony. Hydrogen chloride is then passed into the stirred solution until a sample of the reaction product dyes cotton red-orange shades. The dyestuff isolated in the usual manner dissolves to an orange solution in concentrated sulphuric acid.

Other acridones may be employed instead of the above-mentioned diphthaloylacridone.

In an analogous manner the brominated diphthaloylacridone which dyes still more reddish-orange shades than the chloro-derivatives can be obtained by the addition of potassium bromide or by the introduction of hydrogen bromide.

Example 12

Hydrogen iodide is passed into a solution of 40 parts of pyranthrone in 400 parts of chlorosulphonic acid, kept at 60° C., to which 4 parts of sulphur have been added until the dyeing on cotton by means of a sample of the reaction product indicates the formation of iodopyranthron. The dyestuff worked up in the usual way is an orange powder dissolving to a blue solution in concentrated sulphuric acid and dyes vegetable fibre from a red-violet vat strong yellow-red shades of good fastness.

Example 13

30.6 parts of anthanthrone are dissolved in 300 parts of a sulphuric acid containing 5 per cent of sulphur trioxide. 17 parts of potassium iodide are introduced during one hour into the solution maintained at 80° C. and the iodination is finished by heating the reaction mass at the said temperature for one further hour. After cooling the reaction mass is poured onto ice and the product filtered off by suction. The iodoanthanthrone obtained dissolves to a green solution in sulphuric acid and dyes cotton orange shades from a red vat.

Example 14

30.6 parts of anthanthrone are converted into iodoanthanthrone as described in the foregoing example and 12 parts of potassium bromide are introduced during one hour into the sulphuric acid solution containing sulphur trioxide at 80° C. which temperature is maintained for one further hour to complete the formation of the dyestuff. The reaction mixture is then worked up as usual and a bromoiodoanthanthrone obtained forming an orange-red powder dissolving to a green solution with a bluish tinge in sulphuric acid and dyeing cotton orange-red shades from a violet-red vat. The dyestuff may, if desired, be purified by means of the oxoniumsulphate of the dyestuff separating from the sulphuric acid solution on dilution with water or by recrystallization from solvents of high boiling point, such as nitrobenzene or trichlorbenzene.

Example 15

33.6 parts of monomethoxyanthanthrone, prepared by treating monohydroxyanthanthrone with the methylester of p-toluene sulphonic acid in trichlorbenzene, are dissolved in 330 parts of chlorosulphonic acid at 0° C. after an addition of 3 parts of iodine. 20 parts of potassium bromide are introduced into the said solution during one hour, the solution being maintained at 0° C. for one further hour and the reaction is completed at ordinary temperature. After one further hour, after dilution with 300 parts of sulphuric acid, the reaction mass is brought onto ice and the deposit filtered by suction and dried. The monobromomethoxyanthanthrone obtained is a red powder dissolving to a green solution in concentrated sulphuric acid and dyes cotton from a red vat blue red shades which are excellently fast against light and atmospheric influences.

The monochloro derivative of monomethoxy-anthanthrone obtained in an analogous manner forms an orange product readily crystallizing from nitrobenzene, dissolves to a green solution in concentrated sulphuric acid, and dyes cotton from a red vat excellently fast orange shades.

Dyestuffs of similar properties are obtained by employing other ethers of hydroxy anthanthrone, for instance ethoxyanthanthrone, omega-chlor-ethoxyanthanthrone and the like instead of methoxyanthanthrone.

*Example 16*

45 parts of methylated dipyrazol-anthronyl are dissolved in 450 parts of chlorosulphonic acid and 30 parts of potassium bromide are introduced into the said stirred solution to which 2 parts of mercury and 2 parts of antimony have been added and which is maintained at between 80 and 90° C. After the reaction is complete, the reaction mixture is worked up as usual. The dyestuff obtained containing chlorine and bromine dyes cotton very fast red shades from a green-blue vat.

What we claim is:—

1. A process for halogenating aromatic compounds which comprises replacing at least one hydrogen atom attaching to the nucleus of an aromatic compound by halogen by acting on the aromatic compound in an acid selected from the group consisting of oleum, chlorosulphonic acid and mixtures of these acids, with a halogen hydride in the presence of a halogen carrier.

2. A process for halogenating aromatic compounds which comprises replacing at least one hydrogen atom attached to the nucleus of an aromatic compound by halogen by acting on a polynuclear aromatic compound in an acid selected from the group consisting of oleums, chlorosulphonic acid and mixtures of these acids, with a halogen hydride in the presence of a halogen carrier.

3. A process for halogenating aromatic compounds which comprises replacing at least one hydrogen atom attached to the nucleus of an aromatic compound by halogen by acting on a polynuclear aromatic compound containing a carbonyl group in an acid selected from the group consisting of oleum, chlorosulphonic acid and mixtures of these acids, with a halogen hydride in the presence of a halogen carrier.

4. A process for halogenating aromatic compounds which comprises replacing at least one hydrogen atom attached to the nucleus of an aromatic compound by halogen by acting on a polynuclear aromatic compound containing a carbonyl group capable of being vatted in an acid selected from the group consisting of oleum, chlorosulphonic acid and mixtures of these acids, with a halogen hydride in the presence of a halogen carrier.

5. A process for halogenating aromatic compounds which comprises replacing at least one hydrogen atom attached to the nucleus of an aromatic compound by halogen by acting on an anthanthrone in an acid selected from the group consisting of oleum, chlorosulphonic acid and mixtures of these acids, with a halogen hydride in the presence of a halogen carrier.

6. A process for halogenating aromatic compounds which comprises replacing several hydrogen atoms attached to the nucleus of an aromatic compound by different halogens by acting on the aromatic compound in an acid selected from the group consisting of oleum, chlorosulphonic acid and mixtures of these acids, with different halogen hydrides in the presence of a halogen carrier.

7. A process for halogenating aromatic compounds which comprises replacing at least one hydrogen atom attached to the nucleus of an aromatic compound by halogen by acting on the aromatic compound in an acid selected from the group consisting of oleum, chlorosulphonic acid and mixtures of these acids, with a halogen hydride in the presence of a halogen carrier, the halogen hydride being produced within the reaction mixture by the interaction of the corresponding alkali metal salt with the said acid.

8. As new articles of manufacture monohalogen derivatives of the compound corresponding to the formula:

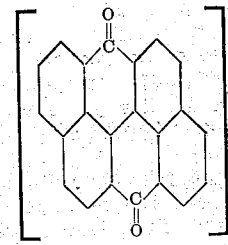

in which R stands for an alkyl group which may be substituted by halogen.

9. As new articles of manufacture monobromo derivatives of the compounds corresponding to the formula:

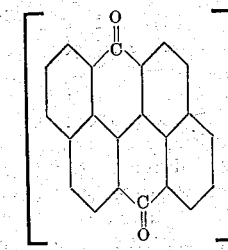

in which R stands for an alkyl group which may be substituted by halogen.

10. As a new article of manufacture mono-bromo-monomethoxyanthanthrone forming a red powder, dissolving to a green solution in concentrated sulphuric acid and dyeing cotton excellent fast bluish red shades from a red vat.

MAX ALBERT KUNZ.
KARL KOEBERLE.
ERICH BERTHOLD.